(12) United States Patent
Foltak et al.

(10) Patent No.: US 7,293,096 B1
(45) Date of Patent: Nov. 6, 2007

(54) MAINTAINING A COMMON AAA SESSION ID FOR A CALL OVER A NETWORK

(75) Inventors: Richard Foltak, Plano, TX (US); Lio Cheng, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 607 days.

(21) Appl. No.: 09/965,932

(22) Filed: Sep. 28, 2001

(51) Int. Cl.
*G06F 15/16* (2006.01)

(52) U.S. Cl. ...................... 709/228; 709/227

(58) Field of Classification Search ........ 709/223–224, 709/227–228; 705/30
See application file for complete search history.

(56) References Cited

U.S. PATENT DOCUMENTS

| | | | | |
|---|---|---|---|---|
| 6,061,650 | A * | 5/2000 | Malkin et al. | 704/228 |
| 6,070,192 | A * | 5/2000 | Holt et al. | 709/227 |
| 6,151,628 | A * | 11/2000 | Xu et al. | 709/225 |
| 6,219,790 | B1 * | 4/2001 | Lloyd et al. | 713/201 |
| 6,298,383 | B1 * | 10/2001 | Gutman et al. | 709/229 |
| 6,377,982 | B1 * | 4/2002 | Rai et al. | 709/217 |
| 6,405,251 | B1 * | 6/2002 | Bullard et al. | 709/224 |
| 6,430,619 | B1 * | 8/2002 | Sitaraman et al. | 709/225 |
| 6,446,200 | B1 * | 9/2002 | Ball et al. | 713/1 |
| 6,560,217 | B1 * | 5/2003 | Peirce et al. | 370/351 |
| 6,614,809 | B1 * | 9/2003 | Verma et al. | 370/469 |
| 6,625,657 | B1 * | 9/2003 | Bullard | 709/237 |
| 6,697,806 | B1 * | 2/2004 | Cook | 707/10 |
| 6,751,663 | B1 * | 6/2004 | Farrell et al. | 709/224 |
| 6,836,765 | B1 * | 12/2004 | Sussman | 705/75 |
| 2002/0046277 | A1 * | 4/2002 | Barna et al. | 709/224 |
| 2002/0069278 | A1 * | 6/2002 | Forslow | 709/225 |
| 2002/0091636 | A1 * | 7/2002 | Carroll Bullard | 705/40 |

FOREIGN PATENT DOCUMENTS

EP 1014619 A1 * 6/2000

OTHER PUBLICATIONS

Rigney, C. et al. "Request for Comments (RFC) 2865: Remote Authentication Dial In User Service (RADIUS)", published by Network Working Group, Jun. 2000, 76 pages.*
Rigney, C. "Request for Comments (RFC) 2866: RADIUS Accounting", published by Network Working Group, Jun. 2000, 28 pages.*
Zorn, G. et al. "Request for Comments (RFC) 2867: RADIUS Accounting Modifications for Tunnel Protocol Support", published by Network Working Group, Jun. 2000, 11 pages.*
Cisco Systems, Inc., "Advanced Virtual Private Dialup Network Configuration", Cisco Configuration Cookbook, Cisco—Advanced VPDN, http://www.ciscopro.com/warp/public/793/access_dial/advancedvpdn.html, 5 pages, © 1992-1999 Cisco Systems, Inc. (printed on May 3, 2001).

(Continued)

*Primary Examiner*—George C. Neurauter, Jr.
(74) *Attorney, Agent, or Firm*—Campbell Stephenson LLP

(57) ABSTRACT

A method, system, and apparatus are provided for maintaining a common session identifier for a call over a network. In at least one embodiment, the session identifier is provided as a non-required parameter in accordance with a tunnel protocol.

67 Claims, 4 Drawing Sheets

OTHER PUBLICATIONS

Cisco Systems, Inc., "Technology Brief—Layer 2 Tunnel Protocol", Technology Briefs, Cisco—Layer 2 Tunnel Protocol, http://www.cisco.com/warp/public/cc/pd/iosw/tech/l2pro_tc.htm, 19 pages, © 1992-2000 Cisco Systems, Inc. (printed on Jul. 12, 2001).

Cisco Systems, Inc., "Which VPN Solution is Right for You?", Tech Notes, http://www.ciscopro.com/warp/public/707/which_vpn.html, 4 pages, © 1992-2001 Cisco Systems, Inc. (printed on May 3, 2001).

Cisco Systems, Inc., "Detailed Scenario for Access VPDN Dial-in Using L2TP", http://www.cisco.com/univercd/cc/td/doc/cisintwk/intsolns/12tp/12tp.htm, 11 pages (printed on May 3, 2001).

Cisco Systems, Inc., "Configuring a Basic Virtual Private Dialup Network (VPDN)", Sample Configurations, http://www.ciscopro.com/warp/public/793/access_dial/vpdn.html, 6 pages, © 1992-2001 Cisco Systems, Inc. (printed on May 3, 2001).

* cited by examiner

MAINTAINING A COMMON AAA SESSION ID FOR A CALL OVER A NETWORK

BACKGROUND OF THE INVENTION

1. Field of the Invention

The present invention generally relates to data network processing and, more particularly, to maintaining a AAA common session id for a call over a data network that involves multiple networking devices.

2. Description of the Related Art

AAA (Authentication, Authorization, and Accounting) is a general term used for the operation and management of authentication and billing systems used in data networking devices. Standard bodies such as the IETF (The Internet Engineering Task Force) have developed protocols such as Radius, to serve as open AAA client/server models. Other companies, such as Cisco Systems, Inc., have also developed proprietary AAA protocols such as TACACS+ to address their own niche requirements. One common aspect of all AAA protocols is that each must provide a means to identify a given session with a unique identifier. However, current implementations limit this identifier to a single data networking device. The Radius protocol supports this identifier via attribute 44, the Accounting-Session-Id. The TACACS+ protocol supports this identifier via the task_id attribute. The identifier will be referred to generically herein as the "session identifier" or "session id."

SUMMARY OF THE INVENTION

A method, system, and apparatus are provided for maintaining a common session identifier for a call over a network. The method comprises providing a session identifier to an off-load server. In at least one embodiment, providing the session identifier further comprises providing the session identifier as a non-required parameter in accordance with a tunnel protocol. In at least one other embodiment, the method comprises inspecting a session setup request received from an access server for a session identifier value and determining whether the session identifier value has been provided. The method further comprises, if the session identifier value is not provided by the access server, assigning the session identifier value.

The system comprises a network access server and an off-load server. The network access server is configured to generate a session identifier. The off-load server is coupled to receive the session identifier from the network access server. In at least one embodiment, the network access server is configured to provide the session identifier to the off-load server in a non-required parameter string according to a tunnel protocol.

The apparatus comprises means for providing a session identifier from an access server to an off-load server. In at least one embodiment, means for providing a session identifier further comprises means for providing the session identifier as a non-required parameter in accordance with a tunnel protocol. In at least one other embodiment, the apparatus comprises means for inspecting a session setup request received from an access server for a session identifier value and means for determining whether the session identifier value is provided by the access server. The apparatus further comprises means for assigning the session identifier value if the session identifier value is not provided by the access server.

BRIEF DESCRIPTION OF THE DRAWINGS

The present invention may be better understood, and its numerous objects, features, and advantages made apparent to those skilled in the art by referencing the accompanying drawings.

FIG. 4, including

The use of the same reference symbols in different drawings indicates similar or identical items.

DETAILED DESCRIPTION

The following sets forth a detailed description of a mode for carrying out the invention. The description is intended to be illustrative of the invention and should not be taken to be limiting.

Figure 1A:
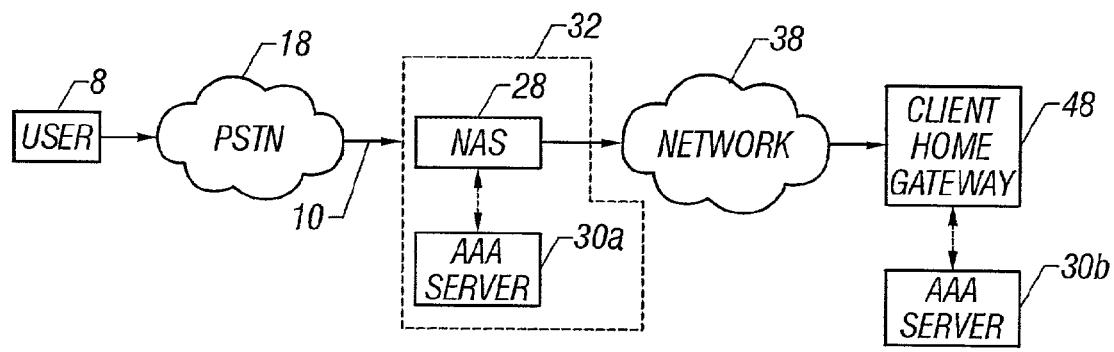
FIG. 1A is a block diagram illustrating a prior art communication network topology.
Figure 1B:
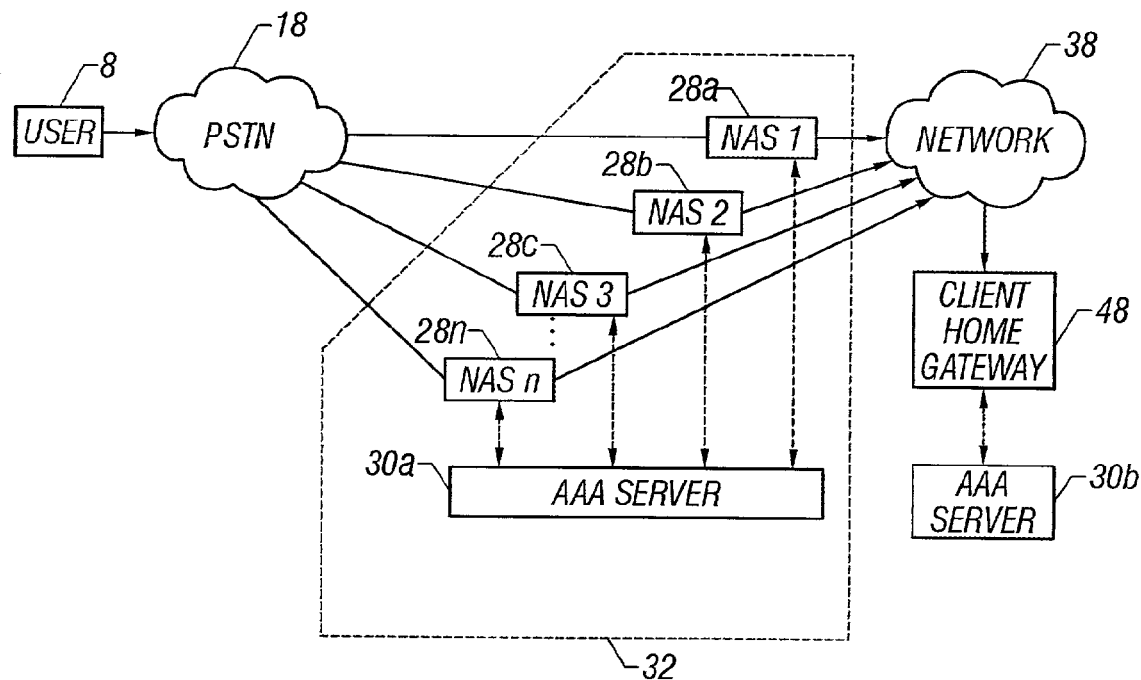
FIG. 1B is a block diagram illustrating a prior art communication network topology that is configured to include multiple network access devices.
Figure 2:
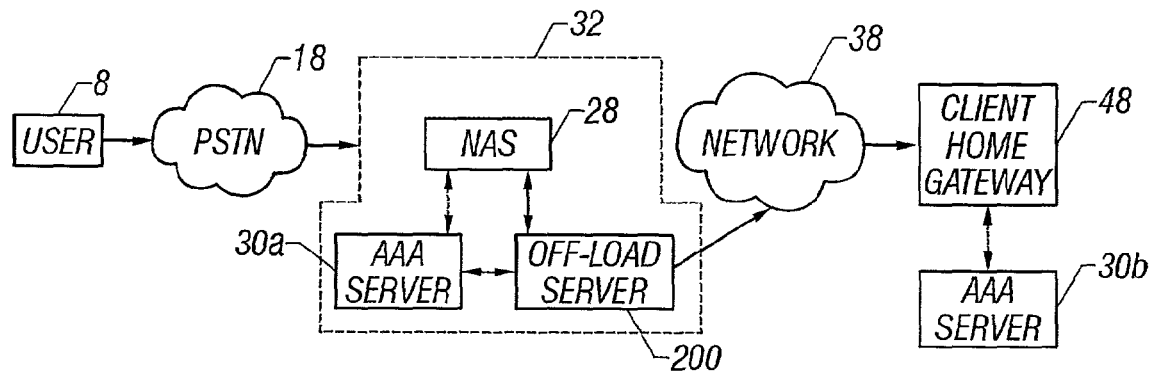
FIG. 2 is a block diagram illustrating a communication network topology that is configured to include an off-load server at the POP.
Figure 3:
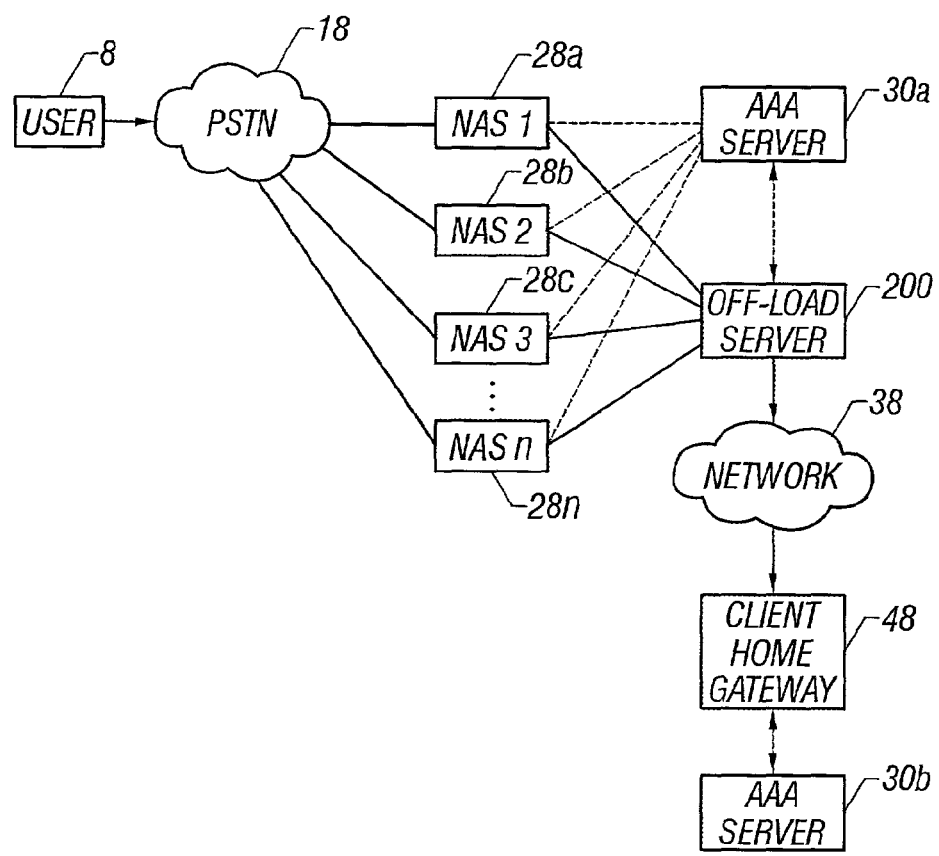
FIG. 3 is a block diagram illustrating a communication network topology that includes multiple network access devices and an off-load server at the POP.

FIGS. 1A and 1B are block diagrams illustrating prior art network topologies. FIGS. 2 and 3 are block diagrams illustrating network topologies in which the present invention may be practiced. The communication networks are shown to include a Public Switched Telephone Network ("PSTN") 18. The PSTN 18 includes devices such as "switches" that form a part of the public telephone network. The PSTN 18 is responsible for multiplexing multiple communications lines into a single digital trunk which, using time-slicing, can compress multiple calls into a single T1 or E1 trunk. Certain countries, such as the United States, utilize T1 trunk lines. In contrast, other countries, such as those in Europe, utilize E1 trunk lines. These T1 or E1 trunk lines are then managed within the PSTN via carrier switches. For the purposes of this discussion, the PSTN 18 includes all devices within the network that are managed by a single carrier switch.

The networks illustrated in FIGS. 1A through 3, including 1B, allow a private network dial-in service (such as AOL, MSN, Juno, etc.), associated with the client server 48, to span across to remote access servers 28, where the remote access servers 28 are managed by wholesale providers. Wholesale data network dial-in services are sometimes referred to as Internet Service Providers ("private network providers"). Remote access servers are often referred to in the art as Network Access Servers ("NAS"). Each of the client servers 48, remote access servers 28, and AAA servers 30 may be, for example, a computer system of any appropriate design, in general, including a mainframe, a mini-computer, or a personal computer system. Such a computer system typically includes a system unit having a system processor and associated volatile and non-volatile memory. They may also include one or more display monitors and keyboards, one or more disk drives, one or more fixed storage devices, and/or one or more printers. These computer systems are typically information handling systems which are designed to provide computing power to one or more users, either locally or remotely (i.e., user 8). Such a computer system may also include one or a plurality of I/O devices (i.e., peripheral devices) which are coupled to the system processor and which perform specialized functions. Examples of I/O devices include modems, sound and video devices, and specialized communication devices. Mass storage devices such as hard disks, CD-ROM drives, and magneto-optical drives may also be provided, either as an integrated or peripheral device. Applications resident within computer systems such as NAS devices 28, AAA servers 30, and home gateway servers 48 are generally stored on and accessed via a computer readable medium, such as a hard disk drive, an optical drive (e.g., CD-ROM drive), floppy disk unit, or other storage medium. Additionally, applications may be in the form of electronic signals modulated in accordance with the application and data communication technology when accessed via network modem or interface. Examples of servers that are used as NAS devices are the AS5800, AS5300, and AS5400 models of products developed by Cisco Systems, Inc. of San Jose, Calif.

It will be noted that the variable identifier "N" is used in FIGS. 1B and 3 to more simply designate the final element (e.g., NAS devices 28a-28n) of a series of related or similar elements (e.g., NAS devices). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Private network dial-in services typically do not maintain their own NAS(s) 28, as this would require installing and maintaining these devices throughout the service's geographic area. That is, a private network dial-in service would have to install NAS equipment at every PSTN area code for which it offers service. Many private network dial-in services wish to avoid the large expense associated with such installation and maintenance. Accordingly, other companies (such as UUNet, Qwest, Genuity, etc.), act as wholesalers for such private network providers. They maintain POPs (Point of Presence) throughout the geographic areas they service, leasing capacity to other private network companies.

Typically, a user 8 dials into a local NAS 28 via the PSTN 18. The user 8 may be the operator of a personal computer (PC) or other type of communication equipment. The user's 8 communication equipment (such as an analog modem or ISDN modem) must first connect with the NAS 28 and negotiate a communication standard with the hardware found on the NAS 28. Once the negotiation is accomplished, the user's 8 equipment must start a service with the network 38, so that the user 8 may be able to access content in the fashion offered by the private network service provider. (The private network service provider often provides its own unique content to the end user 8 as a service differentiator). For example, the user 8 equipment typically establishes a Point-to-Point ("PPP") session with a client server 48, also known as a "home gateway server," using a VPDN (Virtual Private Data Network) tunneling protocol such as L2F or L2TP. A PPP session is typically initiated when a user 8 wishes to establish a connection with a networking device such as the client server 48. The NAS 28, in conjunction with the AAA (Authentication, Authorization, and Accounting) server 30a, determines whether the PPP session should be forwarded to the client server 48, which acts as the home gateway router for the private network service provider. On its home gateway 48, the private network service provider authenticates the user 8 via its own AAA server 30b. The client server 48 then starts the PPP negotiation. After the PPP setup is complete, all frames are sent via the NAS 28 between the user 8 and the home gateway 48.

In the network illustrated in FIGS. 1A and 1B, the PSTN 18 typically contains line cards (not shown), which are essentially carrier switches used by the telephone company for switching various incoming calls to different destinations. Based on the number that the user 8 dialed the PSTN 18 switches the call to the desired destination. The PSTN 18 switches the incoming call to a local NAS 28, when the appropriate number is dialed. As described above, the NAS 28 is typically associated with a remote access wholesaler provider because most private network service providers typically do not own NAS 28 hardware in the user's 8 locale. Instead, the private network service provider has a home gateway server 48 at some location remote from the NAS 28. As stated above, this is because most private network service providers do not provide their own NAS hardware but, rather, lease access server service from a wholesale provider such as Genuity, GTE, UUnet, Southwestern Bell, or another provider of wholesale access server service.

The NAS 28 converts data traffic from the PSTN protocol (i.e., a timeslot protocol) to a packetized data protocol (such as PPP) that is used within data networks such as the network 38. A NAS 28 is essentially a specialized type of router having a T1/E1 controller card. The T1/E1 controller card includes hardware for multiplexing and de-multiplexing Time Division Multiplexed ("TDM") signals coupled onto T1 or E1 lines. That is, the TDM hardware separates the calls that are coupled onto a PSTN trunk based upon assigned time slots, into individual calls. A router is a device that can select a path that information traveling through a packet switching network environment should take.

When a NAS 28 receives a call from the PSTN 18, most often, some level of call authentication must take place. The user 8 that has initiated the call typically provides authentication information, such as when user 8 provides a username (such as jane.doe@msn.com) and a password when attempting to log in to the user's 8 service provider. In at least one embodiment, the password is encrypted. Authentication of such information is part of a concept known as AAA (Authentication, Authorization, and Accounting). The NAS 28 performs the client side AAA processing. In most embodiments of such networks, such as the embodiments illustrated in FIGS. 1A and 1B, a server 30a separate from the NAS 28 performs AAA server-side services (accepts or rejects client side requests) based on the server's database account records. In some prior art embodiments, server-side AAA services are performed on the NAS 28 itself; however, such embodiment is not scalable and is often limited.

AAA client/server services can be performed according to any of several protocols. One such protocol is the Remote Authentication Dial-in User Service (RADIUS) protocol, which is an access server authentication, authorization, and accounting protocol developed by Livingston Enterprises, Inc., which has been acquired by Lucent Technologies, Inc., that has been standardized by the IETF. Another such protocol is the Terminal Access Controller Access Control System ("TACACS+") protocol, which is an access server authentication, authorization, and accounting protocol developed by Cisco Systems, Inc. of San Jose, Calif.

When the NAS 28 receives the call, it opens a session for the call. A session id is then assigned to the call. For instance, if AAA services are performed according to the RADIUS protocol, the session id corresponds to Radius Attribute 44. As another example, if AAA services are performed according to the TACACS+ protocol, the session id corresponds to the task_id attribute. The NAS 28 then builds an AAA access request for the call. As stated above, this authentication processing can be either carried out by one or more software modules that run on the NAS 28, or can be off-loaded to a separate AAA server 30a that runs such processing and forwards the session id access response back to the NAS 28. In at least one embodiment of a separate AAA server 30, the AAA server 30 includes a hardware server along with a daemon process that runs on the server hardware, the daemon software modules implementing an AAA protocol such as the RADIUS protocol. The NAS 28 and AAA server 30a are considered part of the wholesale provider's Point of Presence (POP) 32. The POP 32 is the physical location found within a given PSTN area code, typically the same room/building, at which a wholesaler manages their networking infrastructure for a given geographic presence.

In order to initiate authentication, the NAS 28, acting as an AAA client, performs processing that creates an Access Request. The Access Request contains attributes such as the username and password. The AAA server 30a receives the access request, authenticates the user, and returns an Access-Reject response or an Access-Accept response to the NAS 28. The AAA server 30a may also return user configuration attributes to the NAS 28. For instance, the AAA server 30a usually returns either an Access-Accept or Access-Reject response to the NAS 28. Along with an Access-Accept response, the AAA server 30a forwards to the NAS 28 a user profile with configuration information regarding how the call is to be handled.

An AAA server 30a can act as a proxy to other AAA servers 30b. For instance, FIGS. 1A and 1B illustrate that the AAA server 30a in the wholesaler's POP 32 forwards information that is ultimately transmitted to the client server's AAA server 30b. The AAA server 30a in the wholesaler's POP 32 allows the wholesaler to keep accounting information to track the resources (i.e., time, packets, bytes, etc.) used during a call. The AAA server 30a can also perform a utilization tracking function known as "port counting."

When the POP AAA server 30a performs port counting, it keeps track of the number of users, at a given time, that have placed calls to a particular phone number. The number that a caller has dialed is identified by a number provided by a Dialed Number Identification Service ("DNIS number"). Port counting is an often-used AAA server 30a feature that requires the NAS 28 to provide 2 levels of authentication referred to herein as "pre-authentication." During pre-authentication, the DNIS number is authenticated during the call setup phase of the call. This action involves sending the DNIS number from the NAS 28 to the AAA server 30a as the username, along with a pre-configured password, and any other attributes typically found in an access request. For pre-authentication, the NAS 28 also provides the AAA server 30a with the Session Id attribute to be used to track this call. During the call setup phase of the call, the NAS 28, based on information from the AAA server 30a, determines whether the maximum number of calls are already logged into the DNIS number associated with a particular private network service provider. The AAA server 30a may reject the call if the AAA server 30a determines the private network service provider has exceeded its lease agreement on the number of simultaneous users which can be logged on to the private network service at a given POP location. If the attempted call would be in excess of the maximum number of allowed calls, the NAS 28 notifies the PSTN that the call cannot be connected. Rejection of call results in the end user 8 receiving a busy signal from the PSTN. In contrast, if the call is allowed during the call setup phase, the AAA server 30a tracks the active call based on the unique session id that was provided to the AAA server 30a from the given NAS 28. In such case, the second level of authentication is performed.

The second level of authentication involves the authentication of the username and password, described above, to determine whether the user 8 is authorized to log on to the private network service whose DNIS was dialed. During this level of authentication, the session id previously provided to the NAS is used. The AAA server 30a searches a database for the user name provided in the Access-Request (i.e., the dialed DNIS number for pre-authentication and the real username for user authentication). The AAA server 30a may also act as a proxy server, and forward the authentication request to AAA server 30b. If the user name does not appear in the database or if the password does not match, then an Access-Reject response is generated. If the user 8 name appears in the database, an Access-Accept response is generated. The Access-Accept response generated by the AAA server 30a (or AAA server 30b, if configured as a proxy server) and forwarded to the NAS 28 includes a list of attribute-value pairs that describe the parameters that are to be used in the session that allows the user to exchange data over the Internet via the client server 48. This may include attributes such as the session's IP address to be used during the duration of the call, or information such as the location (address) of client server 48 with which the session must interface.

The AAA server 30a also performs accounting processing to accurately capture session information for billing and tracking purposes. Furthermore, AAA server 30a may also act as a proxy to AAA server 30b, whereby accounting records are first sent to AAA server 30a from NAS 28, processed on AAA server 30a, and then forwarded to AAA server 30b. This is used to ensure that all billing records and wholesale agreements are tracked between the wholesaler and the private network dial-in service.

The accounting processing performed by the AAA server 30a further includes a function critical for port counting. That is, a feature of accounting processing is the request for a STOP record when a session call has terminated. The STOP record is the only record provided to the AAA server 30a indicate that a call has ended for a given session. The STOP record allows the AAA server 30a to determine when a session has ended. Therefore, by keeping track of the beginning (pre-authentication Access-Request) and end (Accounting-Request of STOP record) of each session, and by keeping track of the DNIS associated with each session, the number of sessions attributed to a particular DNIS (thus, private network dial-in service) can be determined at any given point in time in real time. This port-counting information is important when the service provider's contract with the wholesaler is based upon a specific capacity (i.e., maximum number of calls that must be supported at one time) rather than upon some other basis, such as a per-call basis.

For the AAA server 30a to accurately port count and manage sessions, it must correlate all Access-Requests and Accounting-Requests generated from the same call. To do this, the same session id number that was assigned for the first AAA server request must be maintained throughout the life of the call. As described herein, embodiments of the invention allow the same session id number to be used to determine whether the user 8 is authorized to connect to the desired client server 48, and also to determine when that call has begun and when it has ended.

In at least one embodiment, once the AAA server 30a has authenticated a call by determining that the user 8 is authorized to connect with the client server 48 whose DNIS number the user 8 dialed, and sent the Access-Accept response to the NAS 28, the NAS 28 determines that it is to forward information, in PPP format, to the client server 48, which acts as a gateway for the private network provider. In order to forward the information, the NAS 28 establishes a Virtual Private Network (VPN) "tunnel" over which PPP packets are sent to the private network service provider's gateway server (i.e., the "client server") 48. The VPN "tunnel" may be established according to one of various software protocols developed for this purpose. Two of these tunnel protocols used to forward PPP data to the home gateway 48 are referred to as Layer 2 Forwarding (L2F) and Layer 2 Tunnel (L2TP). The L2F and L2TP protocols are herein referred to collectively as "L2x."

The client server 48 performs its own authentication of information received over the L2x tunnel using its own AAA server 30b. Once this authentication occurs, the user 8 is enabled to send and receive data over the network 38 via a PPP session with the private network provider's client server 48.

FIG. 1B is a block diagram illustrating a prior art communications network topology that includes multiple network access servers 28a-28n at the POP 32. Each NAS 28 assigns a session id to a call in the order that the call is received. That is, the first call is assigned a session id of "01," the second is assigned a session id of "02," and so forth. In the network illustrated in FIG. 1B, the result is that NAS 28a can have a call to which it has assigned a session id value of "01," as can each of the other NAS devices 28b-28n. Accordingly, it is possible for the AAA server 30a to receive n session id values, where each of the n session id values corresponds to a different NAS 28 but is the same number. The AAA server 30a can easily handle this condition because the AAA server 30a associates each session id value with the corresponding NAS 28 based upon a unique NAS address for each NAS. Because each of these duplicative session id's is coming from a different NAS address, the AAA Server 30a can distinguish between the NAS's 28a-28n when managing the sessions involved.

FIG. 2 is a block diagram illustrating a communications network topology that includes an off-load server 200. A recent architectural evolution has produced the result that wholesale providers are re-designing their hardware configuration such that the PPP session is not administered by the NAS 28. Instead, the PPP protocol software resides on the off-load server 200. The off-load server 200 provides PPP service for the NAS device 28. One of skill in the art will recognize that the PPP protocol is only one of several options for establishing a connection with a network such as the Internet. Other protocols include SLIP (Serial Line Internet Protocol) and variations of PPP including MP (Multipoint Point-to-Point Protocol) and PPPoE (Point-to-Point Protocol over Ethernet). As such, the term "off-load" server will be understood to be any device that is capable of establishing a network connection using PPP or any other known protocol.

The migration of the PPP software from the NAS 28 to the off-load server 200 has ramifications in the authentication and port-counting processes discussed above. In particular, the topology illustrated in FIG. 2 results in a single AAA server 30a providing AAA server-side services for both the off-load server 200 and the NAS device 28. When an off-load server 200 is included in the topology, port counting becomes unworkable because the off-load server 200 typically assigns its own new session id to the call when it begins setup processing for the call.

In the FIG. 2 topology, as in the topologies discussed above, the NAS 28 assigns a session id during the pre-authentication processing (i.e., building an Access Request for the DNIS user name) performed when the NAS 28 receives a call setup from the PSTN 18 network. Each NAS 28 assigns a session id to a call in the order that the call is received. The NAS 28 thus performs pre-authorization, but does not perform the PPP service.

Instead, the PPP service is performed by the off-load server 200. Ordinarily, the off-load server 200 assigns a new session id when it begins PPP processing because the client AAA software found on the off-load server 200 has not assigned a session id to the call yet. This multiple assignment occurs because there is no mechanism in the current L2x protocols designed to communicate to the off-load server 200 the session id used by the NAS 28 involved in the call setup during pre-authentication. Nonetheless, it is desirable for the off-load server 200 to maintain the same session id for a session that was assigned to the call by the NAS 28 during pre-authentication processing.

The inventors have determine that it is thus necessary for the off-load server 200 to receive an indication of the session id assigned by the NAS 28. Such an indication is not ordinarily provided to the off-load server 200 from the NAS as a required parameter in the L2x protocols. In order to provide the session id as part of the VPN parameters, the inventors have taken advantage of a feature of the L2x protocols that provide for a string of non-required parameters. The list of mandatory and optional parameters is provided by the NAS 28 to the off-load server 200 during the L2x negotiation. The off-load server 200 inspects the NAS 28 L2x tunnel session setup request for a session_id parameter in the string of non-required parameters. If the off-load server 200 encounters, as a result of this inspection, a string corresponding to the session_id parameter, the off-load server 200 uses the value within that string as the session id, instead of assigning a new value for the session id.

FIG. 3 is a block diagram illustrating a communications network topology that includes an off-load server 200 and multiple NAS devices 28a-28n. The off-load server 200 provides PPP service for a plurality of NAS devices 28a through 28n. Collectively, the plurality of NAS devices 28a through 28n, along with the off-load server 200, are referred to herein as an "access path" device.

In this topology, as in the topologies discussed above, each NAS 28a-28n assigns a unique session id during the pre-authentication processing (i.e., building an Access Request for the DNIS user name) performed when the NAS 28 receives a call setup from the PSTN 18 network. Again, it is desirable for the AAA server 30a to use this same session id when it performs accounting functions, such as port counting, related to the call. As discussed above, in at least one embodiment of the present invention, the session id assigned by the NAS 28 is forwarded to the off-load server 200 in a non-required parameter list. However, this solution creates an additional hurdle in a topology wherein the AAA server 30a is responsible for providing server-side services for multiple NAS devices 28a-28n.

The off-load server 200 is one device, with a single address. Thus, the AAA Server 30a, when it receives a session id from the off-load server 200 (which the off-load server 200, in turn, has previously received from one of the NAS devices 28*a*-28*n*), has no way of knowing, under current AAA protocols, which NAS device 28 the session id is associated with. This renders it difficult for the AAA server 30*a* to maintain the same session id for a call that was assigned by one of the NAS devices 28*a*-28*n* during pre-authentication.

To address this challenge, the inventors have determined an efficient manner of indicating to the AAA server 30*a* which of several identical session id's is to be attributed to a specific call. Each NAS 28 is associated with a unique identifier, such as a unique IP address. This unique identifier is appended to the session id so as to create a unique appended session id corresponding to a particular call on a particular NAS 28. This unique appended session id is provided to the AAA server 30*a* during the pre-authentication stage of a call setup. Under this approach, no two NAS devices 28*a*-28*n* will ever send the same unique appended session id to the AAA server 30*a* or to the off-load server 200.

Figure 4A:
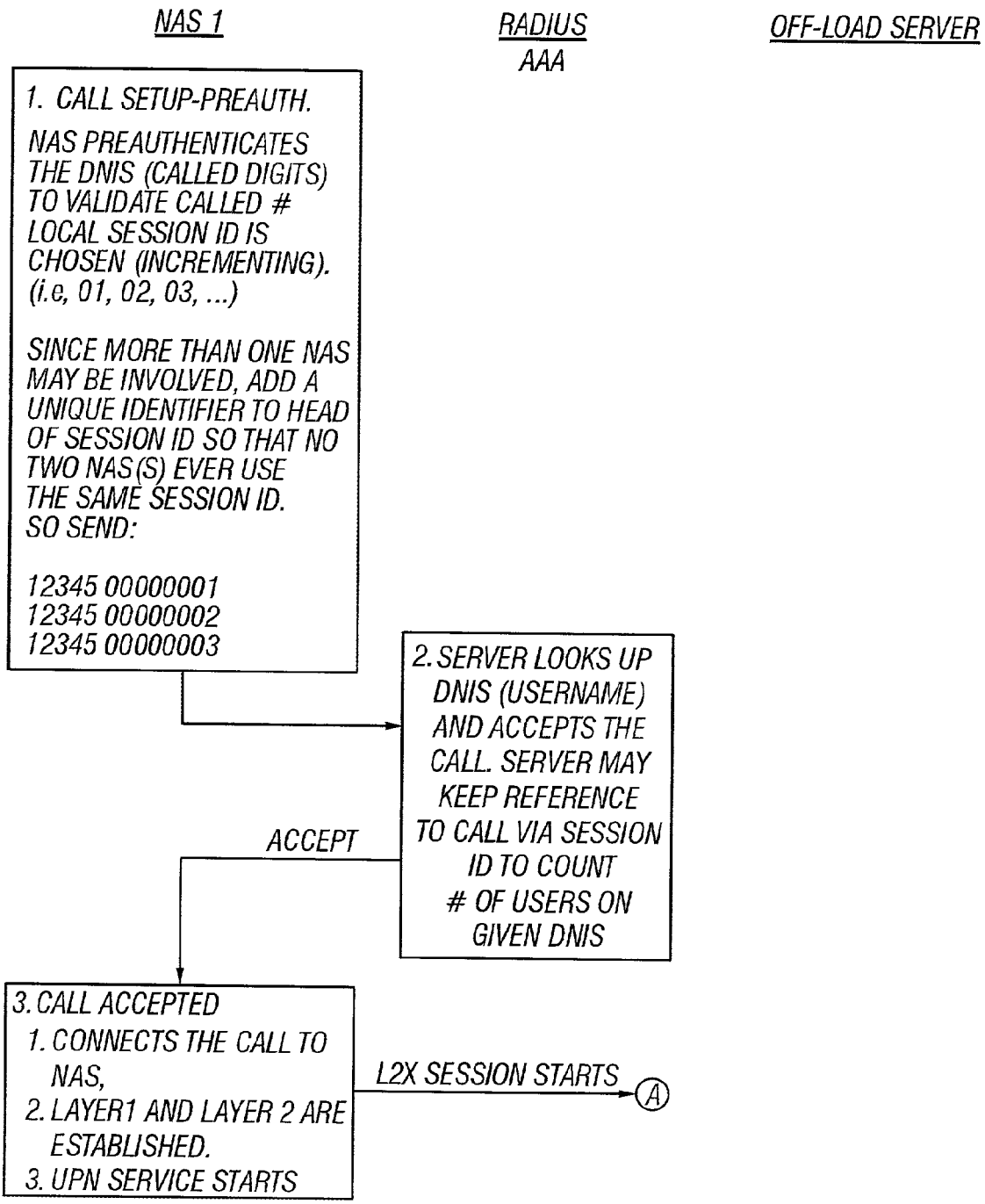
FIG. 4A and FIG. 4B, is a functional diagram illustrating a method of maintaining a common AAA session identifier for a call.
Figure 4B:
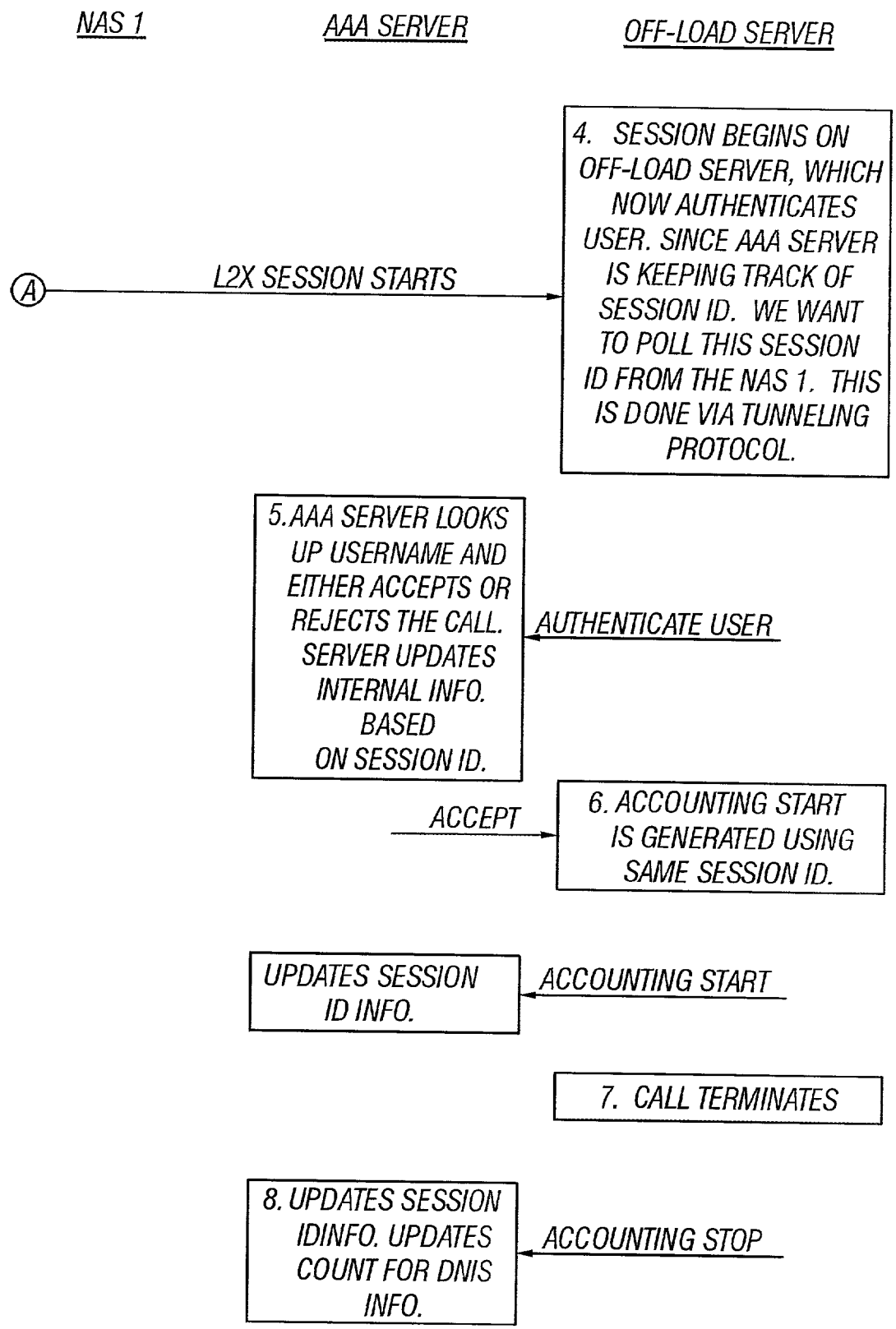

FIG. 4, including FIG. 4A and FIG. 4B, is a functional diagram illustrating a method of maintaining a common and unique session identifier for a call. FIGS. 2 AND 3 are referred to for purposes of discussing the method. In at least one embodiment the operations illustrated in FIG. 4 are implemented in one or more software modules. The operations referred to herein may be modules or portions of modules (e.g., software, firmware, or hardware modules). For example, although the described embodiment includes software modules, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in the example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the operations of the functional diagram may be executed by a module (e.g., a software module) or a portion of a module or a computer system user using, for example, a computer system such as the NAS devices 28, AAA server 30, or client server 48 previously mentioned, or a similar network element. Thus, the method described herein, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

In operation 1, the NAS 28 performs call setup and pre-authorization processing. As part of this processing, the NAS 28 generates an Access Request that includes the dialed DNIS number in the username field of the record. The NAS 28 also assigns a session id to the call. In order to facilitate maintenance of a common id between the NAS 28 and the AAA server 30*a*, the NAS 28 appends the IP address to the session id to its own IP address to generate a unique appended session id. The unique appended session id is then included in the Access Request.

In operation 2, the Access Request, containing the appended session id, is forwarded from the NAS 28 to the AAA server 30*a*. The AAA server 30*a* performs authentication on the call by looking up the username that it has received from the NAS 28 in the Access Request. The AAA server 30*a* checks the username (i.e., dialed DNIS number) against a database stored on the AAA server 30*a*. If the dialed DNIS number is found, the NAS 28 generates an Access Accept response. As discussed above, for accounting functions, such as port counting, the AAA server 30*a* may keep track of the call by reference to the unique appended session id.

Operation 3 of FIG. 4 is triggered when the NAS 28 receives an Access-Accept response from the AAA server 30*a*. The NAS 28 connects the call by coupling the T1 timeslot for the call with a free modem within the NAS 28. The modem (or similar device) then performs the hardware negotiation with the client modem (or similar device) of the user 8 to establish how the two devices will communicate. In this manner, layers 1 and 2 (hardware protocol) of the data communication link between the two devices are established. An L2x session is then initiated, in order to establish a VPN tunnel between the NAS 28 and the off-load server 200.

In operation 4, the L2x session begins on the off-load server 200. The off-load server 200 builds another Access Request that will go to the AAA server 30*a*, this time to authenticate the user 8 that is attempting to establish the PPP session. Because the AAA server 30*a* is keeping track of the session via the appended unique session id that it received from the NAS 28 in operation 3, the off-load server 200 must also make itself aware of the session id in order to communicate with the AAA server 30*a* using this same identifier. In order to do so, the off-load server 200 locates the session-id string from the L2x tunnel session setup request which the NAS 28 initiated. This is done via the L2x tunneling protocol.

In operation 5, the off-load server 200 provides the AAA server 30*a* with the second Access Request. In this list, the username field holds the value of an identifier that is associated with the user 8. For instance, if the user 8 is associated with an Internet identifier such as jane.doe@msn.com, then "jane.doe" is forwarded in the username field. The AAA server 30*a* determines whether the user is authorized to establish a connection with the private network service provider's gateway server 48. The AAA server actually may only act as a proxy for the authentication request and actually forward this Access Request to the AAA server 30*b*. Regardless, the AAA server 30*a* sends an Access-Accept response, if accepted, and forwards the response to the off-load server 200.

In operation 6, the AAA server 30*a* forwards an accept response to the off-load server 200 if the username authentication is successful. The off-load server 200 receives the response and, in turn, generates an Accounting START record that is associated with the session id that the off-load server 200 received in the L2x setup request that was performed in operation 4. The START record is forwarded to AAA server 30*a*. The AAA server 30*a* may update its accounting information concerning the session id accordingly. For instance, the AAA server 30*a* updates the state of the calls it is counting for the private network service provider.

In operation 7, the PPP session is terminated. Upon termination, the off-load server 200 generates an Accounting Request STOP record associated with the session id and forwards the stop record to the AAA server 30*a*.

In operation 8, the AAA server 30*a* receives the stop record and updates accounting information for that session id accordingly. For instance, the port count for the private network provider can be decremented now that a call to the private network service provider's DNIS number has been terminated.

The software modules used to implement the operations of FIG. 4 may be received, for example, from computer readable media. The computer readable media may be permanently, removably, or remotely coupled to the computer system. The computer readable media may non-exclusively include, for example, any number of the following: magnetic storage media including disk and tape storage media, optical storage media such as compact disk media (e.g., CD-ROM, CD-R, etc.) and digital video disk storage media, nonvolatile memory storage memory including semiconductor-based memory units such as FLASH memory, EEPROM, EPROM, ROM, or application specific integrated circuits volatile storage media including registers, buffers or caches, main memory, RAM, and the like, and data transmission media including computer network, point-to-point telecommunication, and carrier wave transmission media. In a UNIX-based embodiment, the software modules may be embodied in a file, which may be a device, a terminal, a local or remote file, a socket, a network connection, a signal, or other expedient of communication or state change. Other new and various types of computer-readable media may be used to store and/or transmit the software modules discussed herein.

Regarding the signals and information passed between blocks in FIG. 4, those skilled in the art will recognize that a signal may be directly transmitted from a first block to a second block, or a signal may be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

In the foregoing manner, a unique session id is maintained for each call among a plurality of NAS devices 28*a*-28*n*, and that unique session id is also maintained by the AAA server 30*a* and the off-load server 200 during call authentication, port counting, user authentication, and accounting, during the PPP session serviced by the off-load server 200.

ALTERNATIVE EMBODIMENTS

While particular embodiments of the present invention have been shown and described, it will be recognized to those skilled in the art that, based upon the teachings herein, further changes and modifications may be made without departing from this invention and its broader aspects.

For example, the off-load server 200 can be any device that provides PPP service or provides any other communication protocol service.

Also, for example, the unique appended identifier need not necessarily utilize the IP address as a unique identifier for each of a plurality of NAS devices 28*a*-28*n*. One skilled in the art will recognize that any identifier that distinguishes a NAS device from the other NAS devices can be appended to the beginning or end of the local session id in order to create a unique appended session id.

We claim:

1. A method for maintaining a common session identifier in a network, comprising:
    associating a session identifier with a user, wherein
        the session identifier is associated with the user by a network access server, and
        the network access server is configured to include the session identifier in a first request sent to an AAA module; and
    providing the session identifier to an off-load server, wherein
        the session identifier is provided to the off-load server directly from the network access server,
        the off-load server is configured to establish a network connection between communication equipment operated by the user and a server operated by a network service provider, and
        the off-load server is configured to include the session identifier in a second request sent to the AAA module.

2. The method recited in claim 1, wherein:
    providing the session identifier further comprises providing the session identifier as a non-required parameter in accordance with a tunnel protocol.

3. The method recited in claim 1, wherein:
providing the session identifier further comprises providing the session identifier in a session setup request.
4. The method recited in claim 1, further comprising:
determining whether the session identifier is provided as a non-required parameter in accordance with a tunnel protocol.
5. The method recited in claim 1, further comprising:
associating a start record with the session identifier.
6. The method recited in claim 5, further comprising:
providing the start record to the AAA module.
7. The method recited in claim 1, further comprising:
associating a stop record with the session identifier.
8. The method recited in claim 7, further comprising:
providing the stop record to the AAA module.
9. A method for maintaining a common session identifier in a network, comprising:
determining whether a session identifier value is provided by an access server to an offload server, wherein
the access server is configured to perform pre-authentication processing for a user,
the offload server is configured to receive the session identifier value directly from the access server, and
the off-load server is configured to use a packetized data protocol to establish a network connection between communication equipment operated by the user and a server operated by a network service provider in response to receiving a request from the access server; and
assigning, if the session identifier value is not provided by the access server to the off-load server, the session identifier value to the user, wherein the assigning is performed by the off-load server.
10. The method recited in claim 9, further comprising:
inspecting a parameter list for the session identifier value.
11. The method recited in claim 9, wherein:
determining whether the session identifier value is provided by the access server further comprises determining whether the session identifier value is contained within a non-required parameter string provided by the access server.
12. The method recited in claim 9, further comprising:
associating a start record with the session identifier.
13. The method recited in claim 12, further comprising:
providing the start record to a software module that provides for performing accounting processing.
14. The method recited in claim 9, further comprising:
associating a stop record with the session identifier.
15. The method recited in claim 14, further comprising:
providing the stop record to a software module that provides for performing accounting processing.
16. The method recited in claim 9, further comprising:
providing the session identifier from the access server to the off-load server.
17. The method recited in claim 16, wherein:
providing the session identifier further comprises providing the session identifier as a non-required parameter in accordance with a tunnel protocol.
18. A system, comprising:
a network access server, wherein the network access server is configured to generate a session identifier, the network access server being further configured to provide the session identifier directly to an off-load server that is configured to establish a network connection between communication equipment operated by a user and a server operated by a network service provider, and both the network access server and the off-load server are configured to send the session identifier to an AAA module.
19. The system recited in claim 18, further comprising:
the off-load server, the off-load server being coupled to receive the session identifier from the network access server.
20. The system recited in claim 18, further comprising:
the AAA module that is configured to perform authentication, the module being further configured to receive the session identifier from the network access server.
21. The system recited in claim 18, wherein:
the network access server is further configured to provide the session identifier in a non-required parameter list according to a tunnel protocol.
22. A system, comprising:
an off-load server, wherein the off-load server is configured to receive a session identifier directly from a network access server, the off-load server is configured to establish a network connection between communication equipment operated by the user and a server operated by a network service provider, and both the network access server and the off-load server are configured to send the session identifier to an AAA module.
23. The system recited in claim 22, further comprising:
the AAA module, the AAA module being further configured to receive the session identifier from the network access server.
24. The system recited in claim 22, wherein:
the off-load server is further configured to receive the session identifier from the network access server in a non-required parameter list according to a tunnel protocol.
25. The system recited in claim 22, wherein:
the off-load server is further configured to generate a start record, the off-load server being further configured to associate the start record with the session identifier; and
the off-load server is further configured to provide the start record to the AAA module.
26. The system recited in claim 22, wherein:
the off-load server is further configured to generate a stop record, the off-load server being further configured to associate the stop record with the session identifier; and
the off-load server is further configured to provide the stop record to the AAA module.
27. An apparatus, comprising:
means for associating a session identifier with a user, in response to a network access server detecting that communication equipment operated by the user is attempting to connect to a server operated by a network service provider; and
means for providing the session identifier directly from an access server to an off-load server, wherein
the off-load server is configured to use a packetized data protocol to establish a network connection between the communication equipment operated by the user and the server operated by the network service provider in response to receiving a request from the network access server.
28. The apparatus recited in claim 27, wherein:
means for providing a session identifier further comprises means for providing the session identifier as a non-required parameter in accordance with a tunnel protocol.

29. The apparatus recited in claim 27, wherein:
means for providing a session identifier further comprises means for providing the session identifier in a session setup request.
30. The apparatus recited in claim 27, further comprising:
means for determining whether the session identifier is provided as a non-required parameter in accordance with a tunnel protocol.
31. The apparatus recited in claim 27, further comprising:
means for associating a start record with the session identifier.
32. The apparatus recited in claim 31, further comprising:
means for providing the start record to an AAA module.
33. The apparatus recited in claim 27, further comprising:
means for associating a stop record with the session identifier.
34. The apparatus recited in claim 33, further comprising:
means for providing the stop record to an AAA module.
35. An apparatus, comprising:
means for determining whether a session identifier value is provided by an access server to an off-load server, wherein
the access server is configured to perform pre-authentication processing for a user,
the offload server is configured to receive the session identifier value directly from the access server, and
the off-load server is configured to use a packetized data protocol to establish a network connection between communication equipment operated by the user and a server operated by a network service provider in response to receiving a request from the access server; and
means for assigning, if the session identifier value is not provided by the access server to the off-load server, the session identifier value to the user, wherein the off-load server comprises the means for assigning.
36. The apparatus recited in claim 35, further comprising:
means for inspecting a parameter list for the session identifier value.
37. The apparatus recited in claim 35, wherein:
means for determining whether the session identifier value is provided by the access server further comprises means for determining whether the session identifier value is contained within a non-required parameter list provided by the access server.
38. The apparatus recited in claim 35, further comprising:
means for associating a start record with the session identifier.
39. The apparatus recited in claim 38, further comprising:
means for providing the start record to a software module that provides for performing accounting processing.
40. The apparatus recited in claim 35, further comprising:
means for associating a stop record with the session identifier.
41. The apparatus recited in claim 40, further comprising:
means for providing the stop record to a software module that provides for performing accounting processing.
42. The apparatus recited in claim 35, further comprising:
means for providing the session identifier from the access server to the off-load server.
43. The apparatus recited in claim 42, further comprising:
means for providing the session identifier further comprising means for providing the session identifier as a non-required parameter in accordance with a tunnel protocol.

44. A computer program product, encoded in computer readable storage media, comprising:
a first set of instructions, executable on a computer system, configured to assign a session identifier to a user, in response to a network access server detecting that communication equipment operated by the user is attempting to connect to a server operated by a network service provider; and
a second set of instructions, executable on the computer system, configured to provide the session identifier directly to an off-load server, wherein
the off-load server is configured to use a packetized data protocol to establish a network connection between the communication equipment operated by the user and the server operated by the network service provider in response to receiving a request from the network access server.
45. The computer program product of claim 44, encoded in computer readable storage media, wherein:
the second set of instructions, executable on the computer system, is further configured to provide the session identifier as a non-required parameter in accordance with a tunnel protocol.
46. The computer program product of claim 44, encoded in computer readable storage media, wherein:
the second set of instructions, executable on the computer system, is further configured to provide the session identifier in a session setup request.
47. The computer program product of claim 44, encoded in computer readable storage media, further comprising:
a third set of instructions, executable on the computer system, configured to determine whether the session identifier is provided as a non-required parameter in accordance with a tunnel protocol.
48. The computer program product of claim 44, encoded in computer readable storage media, further comprising:
a third set of instructions, executable on the computer system, configured to associate a start record with the session identifier.
49. The computer program product of claim 48, encoded in computer readable storage media, further comprising:
a fourth set of instructions, executable on the computer system, configured to provide the start record to an AAA module.
50. The computer program product of claim 44, encoded in computer readable storage media, further comprising:
a third set of instructions, executable on the computer system, configured to associate a stop record with the session identifier.
51. The computer program product of claim 50, encoded in computer readable storage media, further comprising:
a fourth set of instructions, executable on the computer system, configured to provide the stop record to an AAA module.
52. A computer program product, encoded in computer readable storage media, comprising:
a first set of instructions, executable on a computer system, configured to determine whether a session identifier value is provided by an access server to an off-load server, wherein
the access server is configured to perform pre-authentication processing for a user,
the offload server is configured to receive the session identifier value directly from the access server, and
the off-load server is configured to use a packetized data protocol to establish a network connection between communication equipment operated by the user and a server operated by a network service provider in response to receiving a request from the access server; and a second set of instructions, executable on a computer system, configured to cause the off-load server to assign, if the session identifier value is not provided by the access server to the off-load server, the session identifier value to the user.

53. The computer program product of claim 52, encoded in computer readable storage media, further comprising:

a third set of instructions, executable on a computer system, configured to inspect a parameter list for the session identifier value.

54. The computer program product of claim 52, encoded in computer readable storage media, wherein:

the first set of instructions, executable on a computer system, is further configured to determine whether the session identifier value is contained within a non-required parameter string provided by the access server.

55. The computer program product of claim 52, encoded in computer readable storage media, further comprising:

a third set of instructions, executable on a computer system, configured to associate a start record with the session identifier.

56. The computer program product of claim 55, encoded in computer readable storage media, further comprising:

a fourth set of instructions, executable on a computer system, configured to provide the start record to a software module that provides for performing accounting processing.

57. The computer program product of claim 52, encoded in computer readable storage media, further comprising:

a third set of instructions, executable on a computer system, configured to associate a stop record with the session identifier.

58. The computer program product of claim 57, encoded in computer readable storage media, further comprising:

a fourth set of instructions, executable on a computer system, configured to provide the stop record to a software module that provides for performing accounting processing.

59. The computer program product of claim 52, encoded in computer readable storage media, further comprising:

a third set of instructions, executable on a computer system, configured to provide the session identifier from the access server to the off-load server.

60. The computer program product of claim 59, encoded in computer readable storage media, wherein:

the third set of instructions, executable on a computer system, is further configured to provide the session identifier as a non-required parameter in accordance with a tunnel protocol.

61. The method of claim 1, wherein the off-load server provides one of Point-to-Point Protocol (PPP), Serial Line Internet Protocol (SLIP), Multipoint Point-to-Point Protocol, and PPP over Ethernet (PPPoE) service to the network access server.

62. The method of claim 61, further comprising:

assigning the session identifier to a call, prior to providing the session identifier to the off-load server; and sending an access request to an Authentication, Authorization, and Accounting (AAA) server, wherein the access request comprises the session identifier and a Dialed Number Identification Service (DNIS) number associated with the call, and the assigning, the providing, and the sending are performed by a network access server.

63. The method of claim 62, further comprising:

sending a second access request from the off-load server to the AAA server, wherein the second access request comprises the session identifier and a username associated with the call.

64. The method of claim 1, further comprising:

both the network access server and the off-load server sending the session identifier to the Authentication, Authorization, and Accounting (AAA) module.

65. A method comprising:

assigning a session identifier to a call detected by a network access server; and providing the session identifier from the network access server to an off-load server, wherein the off-load server provides one of Point-to-Point Protocol (PPP), Serial Line Internet Protocol (SLIP), Multipoint Point-to-Point Protocol, and PPP over Ethernet (PPPoE) service to the network access server.

66. The method of claim 65, further comprising:

sending an access request to an Authentication, Authorization, and Accounting (AAA) server, wherein the access request comprises the session identifier and a Dialed Number Identification Service (DNIS) number associated with the call, and the assigning, the providing, and the sending are performed by the network access server.

67. The method of claim 66, further comprising:

sending a second access request from the off-load server to the AAA server, wherein the second access request comprises the session identifier and a username associated with the call.

* * * * *